United States Patent
Chakrapani et al.

(10) Patent No.: US 6,416,827 B1
(45) Date of Patent: Jul. 9, 2002

(54) SPD FILMS AND LIGHT VALVES COMPRISING SAME

(75) Inventors: Srinivasan Chakrapani, Commack; Steven M. Slovak, Massapequa; Robert L. Saxe, New York; Barry Fanning, Patchogue, all of NY (US)

(73) Assignee: Research Frontiers Incorporated, Woodbury, NY (US)

( * ) Notice: Subject to any disclaimer, the term of this patent is extended or adjusted under 35 U.S.C. 154(b) by 45 days.

(21) Appl. No.: 09/699,160

(22) Filed: Oct. 27, 2000

(51) Int. Cl.⁷ .......................... C09K 19/02; G02F 1/01; F21V 19/14
(52) U.S. Cl. .................. 428/1.31; 428/1.5; 428/448; 252/582; 252/583; 252/585; 359/296; 522/71; 522/99; 522/148; 522/172
(58) Field of Search ................. 252/582, 583, 252/585; 359/296; 522/71, 99, 148, 172; 428/1.31, 1.5, 448

(56) References Cited

U.S. PATENT DOCUMENTS

| | | | |
|---|---|---|---|
| 3,992,486 A | * 11/1976 | Lang ........................ 260/885 |
| 4,247,175 A | 1/1981 | Saxe ........................ 350/362 |
| 4,407,565 A | 10/1983 | Saxe ........................ 350/374 |
| 5,075,021 A | * 12/1991 | Carlson et al. ............. 252/73 |
| 5,409,734 A | * 4/1995 | Lee et al. ................ 427/163.1 |
| 5,463,491 A | 10/1995 | Check, III ................ 359/296 |
| 5,463,492 A | 10/1995 | Check, III ................ 359/296 |
| 5,467,217 A | 11/1995 | Check, III et al. .......... 359/296 |
| 5,728,251 A | 3/1998 | Check, III ................ 156/307.5 |
| 6,114,405 A | 9/2000 | Zhuang et al. ............. 522/99 |
| 6,187,222 B1 | * 2/2001 | Coates et al. ............. 252/299.01 |
| 6,301,040 B1 | * 10/2001 | Chakrapani et al. ........ 359/296 |

* cited by examiner

*Primary Examiner*—Robert Dawson
*Assistant Examiner*—Jeffrey B. Robertson
(74) *Attorney, Agent, or Firm*—Mark A. Farley; Cooper & Dunham LLP

(57) ABSTRACT

A film suitable for use as the light-modulating unit of an SPD light valve, the film comprising a cross-linked polymer matrix and having droplets of a liquid light valve suspension distributed in the cross-linked polymer matrix, the liquid light valve suspension comprising particles suspended in a liquid suspending medium, wherein the matrix and the droplets each have a refractive index within a range of from about 1.455 to 1.463 and wherein the refractive index of the droplet and the matrix components of the film are preferably matched as closely as possible within RI 0.005 of each other.

30 Claims, No Drawings

SPD FILMS AND LIGHT VALVES COMPRISING SAME

FIELD OF INVENTION

The present invention relates to improved suspended particle device ("SPD") films, and to light valves comprising such films.

BACKGROUND OF THE INVENTION

Light valves have been known for over sixty years for the modulation of light. As used herein, the term "light valve" is defined as a cell formed of two walls that are spaced apart by a small distance, with at least one wall being transparent. The walls are provided with electrodes thereon, usually in the form of transparent, electrically conductive coatings. The cell contains a light-modulating element (sometimes herein referred to as an "activatable material"), which may be either a liquid suspension of particles or a plastic film in which droplets of a liquid suspension of particles are distributed.

The liquid suspension (sometimes herein referred to as "a liquid light valve suspension") comprises small particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs".

Light valves have been proposed for use in numerous applications including, e.g., alphanumeric displays and television displays; filters for lamps, cameras, optical fibers and for displays; and windows, sunroofs, sunvisors, eyeglasses, goggles and mirrors and the like, to control the amount of light passing therethrough or reflected therefrom as the case may be. Examples of windows, without limitation, include architectural windows for commercial buildings, greenhouses and residences, windows for automotive vehicles, boats, trains, planes and spacecraft, windows for doors including peepholes, and windows for appliances such as ovens and refrigerators, including compartments thereof.

For many applications, it is preferable for the activatable material, i.e,. the light modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects, e.g., bulging, associated with a high column of liquid suspension can be avoided through use of a film, and the risk of possible leakage can also be avoided. Another advantage of using a plastic film is that in a plastic film, the particles are generally present only within very small droplets and, hence, do not noticeably agglomerate when the film is repeatedly activated with a voltage.

A "light valve film" as that term is used herein, refers to a film having droplets of a liquid suspension of particles distributed in the film or in part of the film.

Light valve films made by cross-linking emulsions are known. See, for example, U.S. Pat. Nos. 5,463,491, 5,463,492 and 5,728,251, and 6,114,405, all of which are assigned to the assignee of the present invention. All of the above patents and any other patents or patent applications and references cited herein are incorporated into this application by reference thereto.

The following is a brief, non-limiting description of liquid light valve suspensions as known in the prior art, which suspensions may be modified in accordance with the present invention as taught herein to obtain improved SPD films and light valves comprising the same.

1. Liquid Suspending Media and Stabilizers.

The liquid light valve suspension may be any liquid light valve suspension known in the art and may be formulated according to techniques known to one skilled in the art. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer, which acts to reduce the tendency of the particles to agglomerate and to keep them dispersed and in suspension.

The liquid light valve suspension useful in the present invention may include any of the liquid suspending media previously proposed for use in light valves for suspending the particles. Liquid suspending media known in the art which are useful herein, include, but are not limited to the liquid suspending media disclosed in U.S. Pat. Nos. 4,247,175 and 4,407,565. In general, one or both of the liquid suspending medium or the polymeric stabilizer dissolved therein is chosen so as to maintain the suspended particles in gravitational equilibrium.

The electrically resistive liquids chosen for use in prior art suspending media in SPD films are typically either "high" molecular weight polymeric liquids or mixtures of "high" and "medium" molecular weight polymeric liquids, as those terms (i.e., high and medium molecular weight) are defined herein, in order to obtain suspensions having optimal viscosity for a variety of coating applications. The prior art, in fact, teaches that by increasing the viscosity of the liquid suspending medium, e.g., with the use of high molecular weight (or mixtures of high and medium molecular weight) suspending liquids, the stability of the emulsion used in forming the light valve film is improved, with a resultant improvement in the properties and performance of the film produced therefrom.

The polymeric stabilizer, when employed, can be a single type of solid polymer that bonds to the surface of the particles, but which also dissolves in the non-aqueous liquid or liquids of the liquid suspending medium. Alternatively, two or more solid polymeric stabilizers may serve as a polymeric stabilizer system. For example, the particles may be coated with a first type of solid polymeric stabilizer such as nitrocellulose which, in effect, provides a plain surface coating for the particles, after which the coated particles are recoated with one or more additional types of solid polymeric stabilizer that bond to or associate with the first solid polymeric stabilizer and which also dissolve in the liquid suspending medium to provide dispersion and steric protection for the particles. Liquid polymeric stabilizers may also be used to advantage, especially in SPD light valve films, as described in U.S. Pat. No. 5,463,492.

2. Particles.

Inorganic and organic particles may be used in a light valve suspension, and such particles may be light-absorbing or light-reflecting in all or part of the visible portion of the electromagnetic spectrum.

Conventional SPD light valves have generally employed polyhalide particles of colloidal size. As used herein, the term "colloidal", when referring to particle size, means that a particle has a largest dimension averaging 1 micron or less. Preferably, polyhalide or other types of particles used or intended for use in an SPD light valve suspension will have a largest dimension which is less than one-half of the wavelength of blue light, i.e., 2000 Angstroms or less, to keep light scatter extremely low.

3. Deficiencies of Prior Art Films

Prior art cross-linkable SPD films, incorporating suspensions of the type described above, suffer from a variety of deficiencies as described herein which have prevented such films from being mass produced and from thus reaching their full commercial potential.

For example, U.S. Pat. Nos. 5,463,491 and 5,463,492 describe cross-linked SPD films usually cured with heat. However, the length of time necessary to cure such a film with heat, i.e., often about 1 hour, is inconveniently long for industrial film-coating processes. By comparison, UV curing of coated films is typically achieved industrially in several seconds, thus enabling a web carrying coated film to move at high speed. Also, in the case of the aforesaid two patents, in order to achieve a relatively uniform distribution of droplets in the cured matrix polymer, it has generally been necessary either to include a separate emulsifier or to incorporate pendant ester groups on the matrix polymer to serve as an emulsifier, i.e., a so-called "cross-linkable emulsifier". Such emulsifiers are required in prior art films due to the inherent instability of the emulsion arising from the complete immiscibility of the matrix polymer and the droplets comprising the liquid light valve suspension. Failure to include an emulsifier in such a system would otherwise permit the droplets to grow too large and thus would result in the formation of an unstable emulsion that could cause problems during film production. Although effective, the cross-linkable emulsifier is difficult to synthesize and does not have a satisfactory, i.e., a sufficiently long, shelf life.

Ultraviolet or electron beam curing of films are well-established industrial techniques. The first attempt to use ultraviolet radiation to cure an SPD film (see U.S. Pat. No. 5,463,491, Example 13) produced a suspension encapsulated within the matrix, but the film was not commercially viable because the liquid suspension in the droplets (or capsules) had been severely degraded, as evidenced by a color change from blue to red. Moreover, the time needed to cure the film with UV radiation, i.e., 10 minutes, was still far too long to be commercially useful. In addition, a mismatch in the indices of refraction of the matrix and suspension in that instance caused unwanted haze, thus negatively affecting the appearance of such SPD films. These problems have been addressed, although not entirely resolved, in subsequent applications filed in the name of the assignee of the present invention (see U.S. Pat. No. 6,114,405) in which the inventors therein have attempted to reduce the cure time from several minutes to several seconds and to match the refractive indices of the polymer system. These improvements resulted in a film that did not exhibit color change, had reduced haze and was commercially more attractive. In the aforesaid U.S. Pat. No. 6,114,405, matching the refractive index values more closely for the suspending medium and the matrix at 1.448 was found to offer a significant improvement in haze reduction. In a subsequent case, U.S. Pat. Ser. No. 09/517,378, filed Mar. 2, 2000, assigned to the Assignee of the present invention, the refractive index of the materials was matched approximately at a value of 1.453, which provided an improvement in emulsion stability without an added emulsifier. Even the emulsions used to form these prior art films, however, are still subject to a degree of instability, which it would be beneficial to eliminate, and which, as described below, is substantially reduced, if not eliminated entirely, by the present invention.

Still further, some prior art SPD films require use of at least one difficult-to-synthesize film-forming monomer. An example of such a monomer is 1,4-bis (hydroxydimethylsilyl) benzene, referred to in Example 24 of U.S. Pat. No. 5,463,492. This monomer is difficult to make and is also very expensive.

Ultraviolet-curable emulsions are described in U.S. Pat. No. 6,114,405 (the '405 patent) which is assigned to the owner of the present invention. Although such emulsions can be rapidly cured without substantial color change, the resulting films still exhibit certain undesired deficiencies. For example, formation of the film described in the '405 patent involved the difficult synthesis of the 1,4-bis (hydroxydimethylsilyl) benzene monomer described above (see Example 1). In addition, the liquid suspensions used in forming such films incorporated a high percentage of fluorinated monomers, which are relatively costly and thus add significantly to the expense of the resultant light valve. Also, it was still necessary to use either a cross-linkable emulsifier or a separate emulsifier in order to effect good droplet distribution in the matrix.

Furthermore, the viscosity of the UV-cross-linkable siloxane copolymers made by the method of the '405 patent was generally very low. For example, in Example 1 of the patent, a method of preparing such a copolymer having a viscosity of only 423 centipoises at 22.9° C. is set forth. In order to achieve satisfactory shelf life for such a UV-cross-linkable polymer, end-capping is required. However, some prior art polymeric syntheses, which used Brönsted Acid catalysts, caused gels to form, and required that end-capping be done at room temperature, rather than at high temperature, in order to keep the molecular weight up, but the catalyst itself limited the peak molecular weight to less than about 10,000. Yields of only 55–65% were typical.

Another deficiency of the prior art films was their relatively slow decay time (20 secs. and more). While this decay time is acceptable for certain applications, a reduced (i.e., faster) decay time is preferred for many other applications.

U.S. application Ser. No. 09/577,803 filed May 24, 2000 and assigned to the assignee of the present application, eliminates the need for a separate emulsifier or a cross-linkable emulsifier. The current application addresses the other deficiencies of the aforesaid prior art SPD films. In addition, it also includes a procedure for making a matrix polymer with much reduced synthesis time, resulting in reduced cost of the film.

SUMMARY OF THE INVENTION

The present invention is directed to improved, radiation cured SPD films, and to light valves incorporating the same, which are produced more simply and quickly, and at a reduced cost, than the films and corresponding light valves previously known in the prior art, while also providing enhanced levels of performance in comparison thereto.

The stability of the emulsion has been substantially enhanced by adjusting the composition of the matrix polymer and the liquid suspending medium such that these materials have a refractive index (RI) within the range of 1.455 to 1.463, more preferably within the range of 1.455 to 1.459, and, most preferably, a refractive index of 1.458. This adjustment, which would be readily understood by one of ordinary skill in this art, requires a reduction/elimination of fluorinated monomer in the suspending polymer and an increase in the amount of phenyl groups on the matrix polymer. These compositional changes, while maintaining immiscibility, increase the affinity between the matrix and liquid suspending medium. This allows small droplets of the liquid suspending medium to exist for substantially longer periods of time without coalescence.

It has additionally been observed that significant reductions in the amount of haze are achieved by maintaining the refractive index of the droplets at a value as close as possible to that of the refractive index of the matrix. Optimally, the best results are achieved when the refractive index values of these components are within about 0.005 of each other. Smaller differences can produce even better results.

The use of the range of refractive indices described above enables addition of low viscosity non-polymeric liquids (fluorinated and non-fluorinated) to the liquid suspending medium. This lowers the overall viscosity of the liquid suspending medium which, in turn, permits rapid orientation and disorientation of the particles in the liquid suspending medium for faster activation (rise) and decay times. Refractive indices lower than 1.458 require more fluorinated non-polymeric liquid, which is a non-solvent for the nitrocellulose coating of the particles. Similarly, refractive indices higher than 1.463 result in enhanced compatibility of the matrix with the liquid suspending medium, especially at elevated temperatures. The matrix polymer is not a good solvent for the nitrocellulose coating of the particles. Non-polymeric liquids useful in the present invention should have a boiling point at atmospheric pressure preferably of at least about 150° C., and more preferably over 200° C. and a refractive index within the above-described range of 1.455 to 1.463. Moreover, these liquids also should be sufficiently polar as to be immiscible in the matrix material. Some representative examples of these materials include, but are not limited to, dimethyl perfluorosuberate (DMFS) and triethyl trimellitate (TETM).

One may begin with a medium molecular weight suspending polymer of RI 1.463 (which does not comprise any fluorinated monomer) in the liquid suspending medium. It then becomes necessary, however, to incorporate an appropriate combination of fluorinated and non-fluorinated non-polymeric liquids to bring the RI of the liquid suspending medium to 1.458 so as to match that of the matrix polymer. Similar results, i.e., faster activation times and better emulsion stability, have been observed with a matrix resin of RI 1.463 while using a liquid suspending medium of 1.463 RI.

When using a liquid suspending medium having a refractive index within the above-noted ranges, containing non-polymeric liquids, high molecular weight suspending polymer is not utilized. The present invention incorporates, in place of the relatively high molecular weight polymers typically chosen for forming prior art light valves, a lower viscosity (relatively speaking) medium molecular weight polymer system. Methods of making such medium molecular weight polymers are well known among those of ordinary skill in this art. They may include, but are not limited to, those described in U.S. Pat. Nos. 5,463,491, 5,463,492, 5,467,217, 5,728,251 and 6,114,405, which are all assigned to the owner of the present invention.

It has been found that by eliminating the use of high molecular weight polymers and limiting the liquid suspending medium to only such medium molecular weight polymers, a relatively low viscosity droplet is produced for incorporation within the film with no diminution in stability, which, furthermore, has a faster response time as discussed further below. This finding is clearly in contrast to the prior art teaching (discussed above) to the effect that higher viscosity solutions are called for in SPD film applications to ensure the stability of the emulsion used to form the film. As used herein, the term "high molecular weight" is defined as including materials having a viscosity of greater than 5,000 cps when measured at 25° C., having number average molecular weights (Mn) greater than 5,000. Alternately, as also used herein a "medium molecular weight" material is one having a viscosity of between 500–5,000 cps when measured at 25° C. and a number average molecular weight of from about 1,000 to 5,000. Non-polymeric liquids used in the droplets, however, generally have molecular weights and viscosities below these levels.

Not only does the present invention provide a significant cost reduction by eliminating or reducing the use of relatively expensive fluorinated monomers, it also substantially reduces the time required for synthesizing the matrix polymer. That is, whereas it previously took from about 5 to 8 hours to prepare the cross-linkable emulsifier used in forming prior art films, the inventors have now found that the corresponding operations with the materials of the present invention now require only from one to one and one-half hours, i.e., a savings of from about 4 to 6.5 hours. This is attributable mainly to the optimization of the catalyst quantity and efficient removal of byproduct (water) from the reaction mixture. As is well understood, moreover, by those who work in this field, such a significant time savings further translates to a substantial savings in the costs associated with making the SPD light valves and films of the invention, and thus the resultant products may be offered in a significantly improved form (as described below) at a substantially lower price than prior art products.

Turning next to the improvements in decay time offered by the present invention, it is noted that the decay time of an SPD film or light valve is related to the film or valve's response time such that the "decay time" as that term is used herein, is defined as the response time required to cover the middle 80% of the transmittance range between the on and off states, once the electrical voltage is removed. Whereas prior art films and associated light valves typically have decay times of twenty seconds or more, the present invention provides films and light valves with a decay time of less than five seconds, i.e., an improvement of over 300%.

The films and corresponding light valves produced according to the present invention thus offer significant savings in the cost and time required for their production, wherein the materials used in forming these products are carefully chosen with matched refractive indices as described above, to provide improved films and light valves having significantly decreased haze coupled with a significant improvement in response time (i.e., as evidenced by the substantial decrease noted in decay time).

The invention is further described below with regard to several preferred embodiments. The invention should not be construed as being limited only to the described embodiments, however, as the following examples are provided as illustrations of, not as limitations to, the invention defined by the appended claims.

DETAILED DESCRIPTION OF THE PREFERRED EMBODIMENTS

EXAMPLES

The following examples are provided for the purpose of illustrating the invention and are not to be construed as limiting the invention in any manner. All parts and percentages are by weight unless otherwise noted.

Example 1

Preparation of an SPD Film with Polymeric Materials Having a Refractive Index (RI) of 1.458

General Procedure for SPD Film formation 0.002 g of Irgacure 819 (Ciba Specialty Chemicals) photoinitiator was dissolved in 1 mL of tetrahydrofuran (THF) and added to 1 g of the matrix resin described in Examples 7 and 8. The combination was mixed well and left in the vacuum oven at 90° C. under reduced pressure for 1 hour. To this was added 0.36 g of medium molecular weight suspending polymer (sometimes referred to herein as "MMWSP", or "the diluting MMWSP") and a paste of 0.018 g of pyrazine dicarboxylic acid polyiodide crystals in 0.182 g of medium molecular weight suspending polymer (called the crystal concentrate). In films produced according to the invention, no high molecular weight suspending polymer (HMWSP) was used in the crystal concentrate, whereas in the prior art a small amount of HMWSP was used in the crystal concentrate. This was done with the objective of decreasing the viscosity of the capsules containing the crystals so as to reduce the response time of the crystals to externally applied electrical voltage. In order to further reduce the response time of the crystals, 50% of the diluting MMWSP was replaced with a non-polymeric liquid mixture matching the refractive index (sometimes herein called the "RI") of the polymer system. The liquid mixture contained dimethyl perfluorosuberate (DMPFS) and triethyl trimellitate (TETM). The respective amounts of those materials used depends on the overall refractive index of the polymer system chosen for the film formation. Thus, for a 1.4587 RI matrix polymer and 1.4582 RI MMWSP, the weight ratio of TETM to DMPFS was 68:32, whereas, in the case of 1.458 RI matrix and a 1.4631 RI MMWSP, the corresponding ratio was 64:36 (so that the 50:50 mixture of the liquids with the MMWSP results in an RI of about 1.458).

After the ingredients were weighed into a vial in proportions as mentioned above, a nicely dispersed emulsion was obtained by stirring with a spatula for a minute. The emulsion was applied onto an indium tin oxide-coated glass plate using a wire-wound glass rod as described in U.S. Pat. No. 6,114,405 and exposed to UV radiation for 30 seconds in order to cure it. Curing may be carried out closed face, i.e., with a second indium tin-oxide coated glass plate on top of the emulsion, under ambient conditions or open face under a blanket of inert gas flush.

Several factors were considered in selecting the appropriate non-polymeric liquids or liquid mixture. The liquids or liquid mixture should have a low enough viscosity to permit a rapid response time of the crystal suspension to externally applied electrical voltage. In addition, the liquids or liquid mixture should not be miscible with the matrix resin at ambient or elevated temperatures (>100° C.), but should be miscible with the MMWSP and nitrocellulose under these conditions. Furthermore, the liquids or the liquid mixture on their own or in combination with the MMWSP should match, as closely as possible, the refractive index of the matrix resin. Still further, the liquids should have high enough boiling points and low enough freezing points that they do not pose operational problems at the realistic temperature extremes which the finished products may be exposed to.

Example 2 (Prior Art)

A film (approximately 2 mils thick) formed with prior art 1.4522 RI matrix resin, 1.4530 RI HMWSP and 1.4537 RI MMWSP, with crystals containing both HMWSP and MMWSP, had a transmittance range of 50 percentage points at 50 V/400 Hz activation and a decay time of more than 1 minute during instant deactivation. However, after an hour-delayed deactivation, the decay time was even greater than 2 minutes.

Example 3

A film formed as described above with a 1.458 RI system, comprising 1.4587 RI matrix and 1.4582 RI MMWSP together with crystal concentrate containing only 1.4582 RI MMWSP had a decay time of 25 seconds ("s.") with 50 V/400 Hz activation. The same film, when continuously activated under similar conditions for 2 hrs. and then deactivated, showed a response time of more than 105 s. The emulsion stability was excellent and the capsules were less than 2 microns in diameter.

Example 4

A film formed with the above-described 1.458 RI system, except that 50% of the diluting MMWSP was replaced with an appropriate non-polymeric liquid mixture as also described in Example 1, demonstrated a decay time of 4.13 s and 4.27 s respectively for instant and 2 hour-delayed deactivations. The emulsion was very stable and the capsules were less than 2 microns in diameter. This example clearly demonstrates that HMWSP is not required in the crystal concentrate, provided the non-polymeric liquid mixture is included in the formulation. This has the twin advantages of cost reduction by decreasing the fluoromonomer in MMWSP and elimination of HMWSP, coupled with quicker response to electrical voltage.

Example 5

A film formed with 1.4587 RI matrix, 1.4634 RI MMWSP and with 50% of the diluting MMWSP being replaced with the (64/36 TETM/DMPFS) liquid mixture mentioned before, had decay times of 7.5 s and 7.9 s for instant and 2 hour-delayed deactivations, respectively. Again, the emulsion was quite stable and the capsules were less than 2 microns in diameter.

Example 6

A film formed with 1.4634 RI matrix, 1.4634 RI MMWSP and crystals in 1.4634 RI MMWSP contained capsules that were less than 2 microns in diameter. The emulsion was very stable. The film was about 3 mils thick and had an off state transmittance of 2.5% and an on state transmittance of 37.5 at 50 Volts RMS and 400 Hertz. Increasing the electric potential increased the range of opening.

Example 7

Procedure for the Synthesis of Matrix Resin with Pendant Phenyls—RI 1.4634

42.08 grams of silanol terminated (82–86%)dimethyl (14–18%)diphenyl siloxane copolymer (purified, RI 1.4715 @ 25° C., Mn=2,072), 5.5 g of silanol terminated polydimethyl siloxane, 4.0 g of 3-acryloxypropyl dimethoxymethyl silane, and 0.8 g of stannous 2-ethylhexanoate were weighed into a 3-necked 500 mL round-bottom flask. 200 mL of heptane was added to the flask at ambient temperature. One neck of the flask served as a port for the agitator shaft. Through the other necks, a thermometer and a 25 mL Dean-Stark trap (D-S) with a condenser were attached. The D-S trap was already filled up to 20 mL with water. The contents of the flask were stirred vigorously. The flask and its contents were then heated to reflux. The condensation reaction was allowed to proceed for 5 hrs. At that time, 14 mL of trimethylethoxysilane was carefully introduced through the top of the condenser and refluxing was continued for an additional 3 hours.

At the conclusion of the end-capping reaction, the polymer was fractionated with a 2:1 volume ratio of ethanol to methanol (total volume was twice the volume of heptane used) added in the same sequence, and the contents of the fractionation were transferred into a separatory funnel. The bottom layer containing the polymer was rotary evaporated under reduced pressure at 80° C.

The yield was 39%. The polymer had a number average molecular weight of about 40,700 and an RI value of 1.4634. (The molecular weight values are based on a polystyrene calibration which is performed in a manner well known in the art.)

Example 8

Procedure for the Synthesis of Matrix Resin with Pendant Phenyls—RI 1.4587

190 grams of silanol terminated (82–86%)dimethyl (14–18%)diphenyl siloxane copolymer (purified, RI 1.4715 @ 25° C., Mn=1,830), 35 g of silanol terminated polydimethyl siloxane, 20 g of 3-acryloxypropyl dimethoxymethyl silane were weighed into a 3-necked 2 L round-bottom flask 975 mL of heptane was added to the flask at ambient temperature. One neck of the flask served as a port for the agitator shaft. Through the other necks, a nitrogen inlet and a 25 mL Dean-Stark trap (D-S) with a condenser were attached. The D-S trap was filled up to 20 mL with water. The contents of the flask were stirred vigorously. Nitrogen was bubbled in a gentle stream. The contents of the flask were then heated to reflux. At reflux, 0.53 g of stannous 2-ethylhexanoate in 25 mL of heptane was syringed into the reaction flask. The condensation reaction was allowed to proceed for 72 minutes. At that time, 150 mL of trimethylmethoxy silane was carefully introduced through the top of the condenser and refluxing was continued for an additional 30 minutes.

At the end of the end-capping reaction, the contents of the flask were cooled & transferred into a 4 L beaker. The flask was washed with an additional 50 mL of heptane and the washings also were added to the beaker. To this agitated solution was added 1,140 mL of ethanol and 1,360 mL of methanol. Agitation was continued for 10 more minutes and the contents of the beaker were then transferred into a 4 L separatory funnel. Layer separation was allowed to proceed for a minimum of two hours. The bottom layer contains the polymer, which is recovered after rotary evaporation of solvent under reduced pressure at 80° C.

The yield was 79.2%. The polymer had a Brookfield viscosity of 8,830 cps, a number average molecular weight of about 26,000 and an RI value of 1.4587. The molecular weight values herein are based on a polystyrene calibration.

This procedure requires much less total time than the procedure for synthesizing a matrix resin with pendant phenyl groups having a RI of 1.4634 or prior art matrices. By suitably adjusting the formulation for the desired refractive index, the procedure described here could be used to synthesize cross-linkable siloxane matrix resins with or without pendant phenyls.

Example 9

Preparation of the Medium Molecular Weight Suspending Polymer—RI 1.4631

To a 4 L five-neck reaction kettle equipped with a thermometer, reflux condenser, mechanical agitator, a dropping funnel, and a nitrogen inlet, were charged 454.2 g of n-butyl acrylate, 10.3 g of 2-hydroxyethyl acrylate and 37.6 g of 1-hexanethiol. The mixture was dissolved in 930 ml of toluene. Nitrogen was continuously bubbled through the reaction mixture throughout the polymerization reaction.

When the solution was heated to 79° C., half the amount of 3.970 g of 2,2'-azobisisobutyronitrile (hereinafter called "AIBN") dissolved in 200 mL of toluene (nitrogen sparged for 2.5 min.) was added via the dropping funnel over 3 minutes. There was a vigorous exotherm. The temperature of the reaction mixture went up to 115° C. in 7 minutes. The rest of the AIBN solution was then added and the reaction solution was then allowed to reflux for three hours.

The reaction solution was allowed to cool to room temperature before the residual monomers, the chain transfer agent and the solvent were removed by using a rotary evaporator for 2.5 hours at 90° C. Also, the recovered polymer was subjected to a thin film evaporation procedure in a falling film equipment at xylene reflux and reduced pressure to further remove the volatiles.

This procedure yielded 370 g of a pale yellow, clear liquid with a refractive index of 1.4629 at 25.0° C., and a Brookfield viscosity of 1,000 cps at 25.0° C.

This product was passed through the KDL-4-1S-OH (UIC, Inc., USA) shortpath distillation unit at 220° C. at 2 m Torr pressure at a wiper motor speed of 940 rpm. After this purification, the RI was 1.4631, and viscosity was 2,230 cps at 25.0° C.

This procedure does not require any fluorinated monomer.

Example 10

Preparation of the Medium Molecular Weight Suspending Polymer RI-1.4582

To a 2 L five-neck reaction kettle equipped with a thermometer, reflux condenser, mechanical agitator, and a nitrogen inlet, were charged 119.4 g of n-butyl acrylate, 9.2 g of heptafluorobutyl acrylate, 3.1 g of 2-hydroxyethyl acrylate and 13.75 g of 1-hexanethiol. The mixture was dissolved in 675 mL of toluene. There was a continuous sparge of nitrogen through the reaction mixture throughout the polymerization reaction.

When the solution was heated to 101° C., 0.657 g of 2,2'-azobisisobutyronitrile ("AIBN") dissolved in 100 mL of toluene was added via the condenser over a one-minute period. There was an exotherm. The temperature of the reaction mixture went up to 108° C. in 2 minutes. The reaction solution was then refluxed for three hours.

The reaction solution was allowed to cool to the room temperature before the residual monomers, the chain transfer agent and the solvent were removed by using a rotary evaporator.

This procedure yielded 132.7 g of a yellow, clear liquid with a refractive index of 1.4571 at 25.0° C., a number average molecular weight of about 1100 and a viscosity of 590 cps at 25.0° C.

The product was passed through the shortpath distillation unit at 200° C. for an hour at 2 m Torr pressure at a wiper motor speed of 940 rpm. After this purification, the RI was 1.4582, viscosity was 830 cps at 25.0° C., and the molecular weight was ~1,900. The molecular weight values are based on a polystyrene calibration.

What is claimed is:

1. A film suitable for use as the light-modulating unit of an SPD light valve, said film comprising a cross-linked polymer matrix and having droplets of a liquid light valve suspension distributed in the cross-linked polymer matrix, said liquid light valve suspension comprising particles suspended in a liquid suspending medium, wherein both said matrix and said droplets have a refractive index within a range of from 1.455 to 1.463.

2. The film according to claim 1, wherein the refractive index of the matrix and the droplets ranges from 1.457 to 1.459.

3. The film according to claim 1, wherein the refractive index of the matrix and the droplets is about 1.458.

4. The film according to claim 1, wherein the refractive indices of the matrix and the droplets are matched within less than about 0.005 of each other.

5. The film according to claim 1, wherein said liquid suspending medium comprises at least one medium molecular weight polymer together with at least one non-polymeric liquid, and wherein said suspending medium is substantially free of any high molecular weight polymer.

6. The film according to claim 5, wherein each said non-polymeric liquid has a boiling point at atmospheric pressure of at least about 150° C. and a refractive index within a range of from 1.455 to 1.463, and wherein said liquid is sufficiently polar so as to be substantially immiscible in said matrix.

7. The film according to claim 6, wherein the boiling point of said at least one non-polymeric liquid is at least about 200° C. at atmospheric pressure.

8. The film according to claim 5, wherein the at least one non-polymeric liquid is dimethyl perfluorosuberate or triethyl trimellitate.

9. The film according to claim 1, wherein the liquid suspending medium is substantially free of fluorinated monomers.

10. In a light valve having opposed cell walls, the improvement wherein the film according to claim 1 is between said cell walls as the light-modulating unit of the light valve.

11. A film suitable for use as the light modulating unit of an SPD light valve, said film comprising a cross-linked polymer matrix and having droplets of a liquid light-valve suspension distributed in the cross-linked polymer matrix, said liquid light valve suspension comprising particles suspended in a liquid suspending medium, wherein the film is radiation cured by application of electron beam radiation or ultraviolet radiation, and wherein said film has a decay time of less than about 5 seconds.

12. The film according to claim 11, wherein both said matrix and said droplets have a refractive index within a range of from 1.455 to 1.463.

13. The film according to claim 12, wherein the refractive index of the matrix and the droplets ranges from 1.457 to 1.459.

14. The film according to claim 12, wherein the refractive index of the matrix and the droplets is about 1.458.

15. The film according to claim 12, wherein the refractive indices of the matrix and the droplets are matched within less than about 0.005 of each other.

16. The film according to claim 12, wherein said liquid suspending medium comprises at least one medium molecular weight polymer together with at least one non-polymeric liquid, and wherein said suspending medium is substantially free of any high molecular weight polymer.

17. The film according to claim 16, wherein each said non-polymeric liquid has a boiling point at atmospheric pressure of at least about 150° C. and a refractive index within a range of from 1.455 to 1.463, and wherein said liquid is sufficiently polar so as to be substantially immiscible in said matrix.

18. The film according to claim 17, wherein the boiling point of said at least one non-polymeric liquid is at least about 200° C. at atmospheric pressure.

19. The film according to claim 16, wherein the at least one non-polymeric liquid is dimethyl perfluorosuberate or triethyl trimellitate.

20. The film according to claim 11, wherein the liquid suspending medium is substantially free of fluorinated monomers.

21. In a light valve having opposed cell walls, the improvement wherein the film according to claim 11 is between said cell walls as the light-modulating unit of the light valve.

22. A method of preparing a film suitable for use as the light modulating unit of an SPD light valve, said method comprising:

preparing a quantity of a polymer matrix material;

forming an emulsion from the combination of at least a portion of the polymer matrix material and a quantity of a liquid light valve suspension, said liquid light valve suspension comprising a plurality of particles suspended in a liquid suspending medium, wherein said droplets and said matrix both have a refractive index within a range of from 1.455 to 1.463; and cross-inking the polymer matrix to produce a film having droplets of the liquid light valve suspension distributed in the cross-linked polymer matrix.

23. The method of claim 22, wherein said polymer matrix is cross-linked by exposing said matrix to a sufficient amount of radiation for a sufficient duration to convert said emulsion to a film.

24. The method of claim 23, wherein said radiation is electron beam radiation or ultraviolet radiation.

25. The method of claim 22, which further comprises maintaining the refractive indices of said droplets and said matrix within a range of from 1.457 to 1.459.

26. The method of claim 22 which further comprises maintaining the refractive indices of both said droplets and said matrix at about 1.458.

27. The method of claim 22, which further comprises matching, as closely as possible, the refractive indices of the droplets and the matrix within less than about 0.005 of each other.

28. The method of claim 22, wherein said liquid suspending medium comprises at least one medium molecular weight polymer together with at least one non-polymeric liquid, said polymer and said liquid chosen to provide said light valve with a delay time of less than about 5 seconds, and wherein said suspending medium is substantially free of any high molecular weight polymer.

29. The film according to claim 28, wherein each said at lest one non-polymeric liquid has a boiling point at atmospheric pressure of at least about 150° C. and a refractive index within a range of from 1.455 to 1.463, and wherein said liquid is sufficiently polar so as to be immiscible in said matrix.

30. The film according to claim 29, wherein the boiling point of said at least one non-polymeric liquid is at least about 200° C. at atmospheric pressure.

* * * * *